No. 871,975. PATENTED NOV. 26, 1907.
A. WACHE.
SAFETY VALVE.
APPLICATION FILED JUNE 4, 1907.

Witnesses
M. C. Lyddane
S. Brashears

Inventor
Alphons Wache
by Paul E. Schilling
Attorney

UNITED STATES PATENT OFFICE.

ALPHONS WACHE, OF KÖNIGSHÜTTE, GERMANY.

SAFETY-VALVE.

No. 871,975.  Specification of Letters Patent.  Patented Nov. 26, 1907.

Application filed June 4, 1907. Serial No. 377,150.

*To all whom it may concern:*

Be it known that I, ALPHONS WACHE, a subject of the King of Prussia, residing at Königshütte, Upper Silesia, German Empire, have invented certain new and useful Improvements in Safety-Valves, of which the following is a specification.

My invention relates to safety valves for preventing the bursting of pipes in consequence of excessive pressure, of that class in which on the normal pressure being exceeded an outlet is opened, whereby the pressure agent can escape.

The essential feature of my invention is the provision of means for causing a vacuum for the purpose of assisting the action of the valve.

Figure 1:
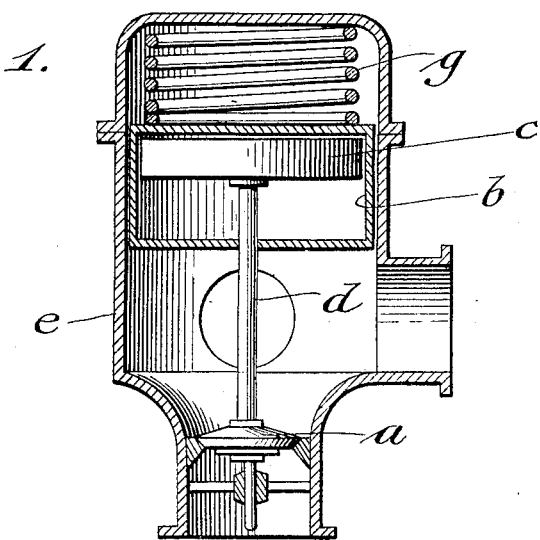
Figure 2:
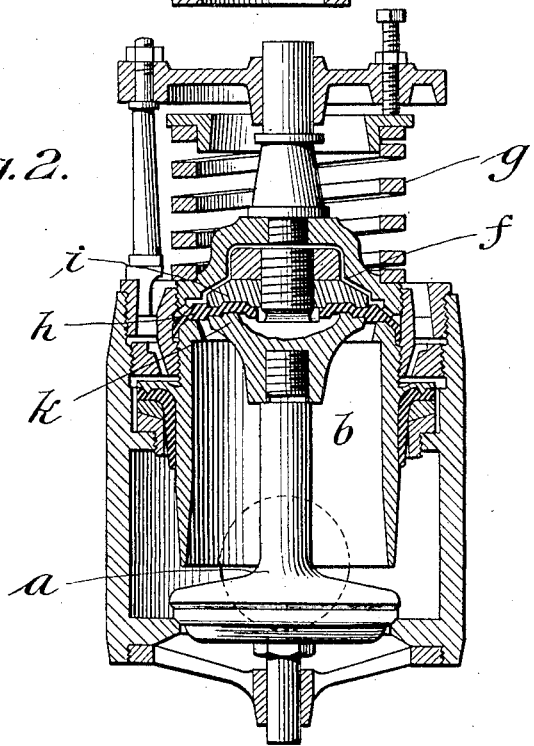

In the accompanying drawing, Figure 1 is a vertical section showing one form of my improved valve. Fig. 2 is a vertical section showing a third form of the valve.

In the valve shown in Fig. 1, the arrangement is such that when the pressure in the pipe increases, an outer piston rises and opens the valve. The piston is hollow and in its interior there is located a second piston. On the hollow piston ascending the position of the two pistons relatively to each other is altered, whereby a vacuum is caused between them, which exerts an influence upon the opening motion of the valve.

Referring specifically to the drawing $a$ is the valve, $b$ a hollow piston, $c$ an auxiliary piston within the hollow piston $b$, $d$ the stem connecting the auxiliary piston $c$ with the valve $a$, and $g$ a spring bearing upon piston $b$ with a tendency to press it toward the valve $a$.

Pressure entering the valve casing $e$ will cause the hollow piston $b$ to move upward on stem $d$ and valve $c$ against the pressure of spring $g$, thus forming a vacuum between the pistons $b$ and $c$ above the latter, which vacuum will cause piston $b$ to move thus unseating valve $a$ and relieving the pressure. When the pressure thus relieved becomes less than the pressure of spring $g$, which will be regulated in any suitable manner, the spring will press valve $a$ downward, carrying piston $b$ with it and again closing the valve, in which position it will remain until again opened by excessive pressure, as before described.

In Fig. 2, the auxiliary piston $c$ is of a different form and is connected to the hollow piston $b$ by means of a flexible diaphragm $h$, the latter being secured between the parts $i$ and $k$ of the auxiliary piston and connected at its periphery with the hollow piston $b$. The piston $b$ is hollow and spring pressed, as in Fig. 1, but may be open at the bottom, and the auxiliary piston, also as in Fig. 1, is connected with the valve by a stem. The action is the same as in Fig. 1, the pressure being exerted on the hollow piston $b$ and causing it to rise. A vacuum is then formed above the auxiliary piston $c$ and between it and the hollow piston $b$, which vacuum causes piston $c$ to rise and open the valve. In this action, the periphery only of the diaphragm $h$ is lifted with piston $b$, the diaphragm bending to permit the piston $c$ and valve $a$ to remain stationary during the first movement of piston $b$, and until the vacuum formed between the two pistons raises the piston $c$ and opens the valve.

The vacuum may be rendered more effective by having the space between the two pistons, above the diaphragm, filled with liquid.

What I claim as new is:—

1. In a safety valve, in combination, a casing, a valve located therein, a piston carrying the valve, and a second piston constructed and arranged so that when the permissible pressure is exceeded a vacuum is formed between the two pistons, substantially as and for the purpose specified.

2. In a safety valve, in combination, a casing, a valve located therein, a hollow loaded piston located above the valve, and an auxiliary piston located within the hollow piston, attached to the valve whereby when the permissible pressure is exceeded the hollow piston ascends and causes a vacuum between the two pistons, substantially as and for the purposes specified.

3. In the safety valve in combination, a casing, a valve therein, a loaded hollow piston, an auxiliary piston within the hollow piston carrying the valve and made in two parts, and a flexible diaphragm clamped centrally between the two parts and connected at its periphery to the hollow piston, substantially as and for the purpose specified.

4. In the safety valve in combination, a casing, a valve therein, a loaded hollow piston, an auxiliary piston within the hollow piston carrying the valve and made in two parts, and a flexible diaphragm clamped centrally between the two parts and connected at its periphery to the hollow piston, the space between the two pistons at the top of the auxiliary piston being filled with liquid, substantially as and for the purpose specified.

In testimony whereof I affix my signature in presence of two witnesses.

ALPHONS WACHE.

Witnesses:
 MOSCO FINZI,
 LOU H. KATZ.